(12) United States Patent
Fujii

(10) Patent No.: US 8,165,476 B2
(45) Date of Patent: Apr. 24, 2012

(54) OPTICAL PHASE LOCKED LOOP

(75) Inventor: Akihiro Fujii, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 449 days.

(21) Appl. No.: 12/457,679

(22) Filed: Jun. 18, 2009

(65) Prior Publication Data

US 2010/0080564 A1    Apr. 1, 2010

(30) Foreign Application Priority Data

Sep. 26, 2008    (JP) ................. 2008-248120

(51) Int. Cl.
*H04B 10/04* (2006.01)
(52) U.S. Cl. .............. 398/198; 398/195; 398/186
(58) Field of Classification Search ............... 398/198, 398/195, 186, 185, 183; 359/237, 238, 276, 359/280, 284, 286, 289
See application file for complete search history.

(56) References Cited

U.S. PATENT DOCUMENTS

| | | | |
|---|---|---|---|
| 2004/0208643 A1* | 10/2004 | Roberts et al. .............. | 398/186 |
| 2006/0291870 A1* | 12/2006 | Wan et al. .................. | 398/183 |
| 2007/0292142 A1* | 12/2007 | Hashimoto et al. ......... | 398/186 |

FOREIGN PATENT DOCUMENTS

| | | |
|---|---|---|
| JP | 07046191 | 2/1995 |
| JP | 2000068580 | 3/2000 |
| JP | 2005-006258 A | 1/2005 |
| JP | 2007-333753 A | 12/2007 |

OTHER PUBLICATIONS

Camatel et al., "10 Gbit/s 2-PSK transmission and homodyne coherent detection using commercial optical components" ECOC 2003, vol. 3, We. P. 122, pp. 800-801.
Stefano Camatel et al., "Design, Analysis and Experimental testing of BPSK Homodyne Receivers Based on Subcarrier Optical Phase-Locked Loop", Journal of Lightwave Technology, vol. 26, No. 5, pp. 552-559, Mar. 1, 2008.

* cited by examiner

Primary Examiner — M. R. Sedighian
(74) Attorney, Agent, or Firm — Rabin & Berdo, P.C.

(57) ABSTRACT

A single sideband modulator uses a radio-frequency signal output by a voltage controlled oscillator to modulate a reference optical signal output by a local light source, thereby obtaining several sideband signals, and combines the sideband signals into a single reproduced optical signal. The optical coupler couples the reproduced optical signal with a received optical signal to generate an optical beat signal, from which a photoelectric transducer and loop filter generate a control voltage for the voltage controlled oscillator. These components operate as an optical phase locked loop that efficiently locks the reproduced optical signal in frequency and phase with the received optical signal by using the energy of all sidebands of the reference optical signal. The phase locked loop is useful for coherent detection of the received optical signal.

17 Claims, 8 Drawing Sheets

OPTICAL PHASE LOCKED LOOP

BACKGROUND OF THE INVENTION

1. Field of the Invention

The present invention relates to an optical phase locked loop that locks a locally generated optical signal in phase and frequency with a received optical signal for coherent detection in optical communication systems.

2. Description of the Related Art

The need to increase optical communication capacity has focused attention and research effort on phase modulation systems, which can assure a higher signal-to-noise ratio than is obtainable by conventional on-off keying (OOK) or amplitude shift keying (ASK). Both phase shift keying (PSK) and differential phase shift keying (DPSK) are being studied.

In any phase modulated communication system, a digital signal modulates the phase of a carrier signal. In optical PSK and DPSK systems, the carrier signal is typically an optical pulse train. In DPSK modulation, the digital information is encoded in the relative phase of consecutive pulses. For example, in a binary DPSK optical transmission signal the phase of each successive optical pulse is shifted by 0 or $\pi$ radians. In PSK modulation, the digital information is encoded in the absolute phase of each transmitted pulse, so the phase of each received pulse must be compared with the phase of a reference signal.

DPSK is easier to implement than PSK, because a DPSK receiver only has to compare the phases of successive received pulses and does not have to generate a reference signal, but the DPSK demodulation process is complex and error-prone.

To generate the reference signal necessary for optical PSK, the receiver must have a local light source precisely locked in frequency and phase with the transmitted optical carrier signal. Once this requirement is met, however, the PSK demodulation process is relatively simple and error-free, because OOK intensity modulation techniques can be used.

Optical phase modulation schemes are also referred to as coherent modulation schemes, since they exploit the coherence of the optical carrier signal. In contrast, schemes that modulate optical pulse intensity make no use of the coherence of the optical carrier signal.

The receiving methods employed in known coherent optical communication systems include both heterodyne and homodyne detection, and homodyne phase diversity detection. All of these methods mix the received optical signal with a reference optical signal generated by a local light source. In heterodyne detection the frequency of the reference optical signal differs slightly from the frequency of the transmitted optical signal, and the phase of the received pulses is detected from the resulting interference beats. In homodyne detection, the reference optical signal has the same frequency as the transmitted optical signal, and the phase of the received pulses is detected as constructive or destructive interference, or varying degrees thereof. In homodyne phase diversity detection, the received signal and reference signal are mixed with a plurality of phase offsets. Homodyne and homodyne phase diversity detection require a strict phase relation to be maintained between the reference optical signal and the transmitted carrier signal.

Among the many optical communication systems that have been reported, there are some that use an optical phase locked loop to maintain the necessary phase relationship between the received and reference optical signals. One such system is described by Ito et al. in Japanese Patent Application Publication No. H07-046191.

An optical phase locked loop operates by the same principle as an electrical phase locked loop (PLL). Most reported optical phase locked loops, however, directly modulate the frequency of a local laser with an optical signal including the phase error, as described, for example, by Imayado et al. in Japanese Patent Application Publication No. 2000-68580. This phase locking system leads to expensive fabrication because of the large size of the necessary components. Furthermore, it sometimes requires direct frequency modulation of a high-speed electrical signal (e.g., several tens of gigahertz), which is difficult because of the limited operating speed of electronic components.

Recently, optical phase locked loops employing sideband techniques have also been developed, as described, for example, by Camatel et al. in '10 Gbit/s 2-PSK transmission and homodyne coherent detection using commercial optical components', ECOC 2003, Vol. 3, We. P. 122, pp. 800-801. The method described by Camatel et al. performs intensity modulation on a locally generated optical signal and selects one of the resulting sidebands as a reference signal; another method uses a bandpass filter to select part of a sideband generated by a phase modulator. Interference between the received optical signal and the reference signal provides feedback for phase locking.

A problem with these conventional optical phase locked loops is that they use the locally generated optical signal inefficiently. Since they use only one sideband resulting from modulation of the locally generated optical signal, they discard most of the energy of the locally generated signal. To compensate for the inefficiency, the selected sideband may require amplification by an optical amplifier, but then noise arising during the amplification process degrades the quality of the reference signal.

Another problem is frequency jitter in the received optical signal and the locally generated optical signal. To cope with such jitter, the optical phase locked loop may have to operate over a frequency range that exceeds the operating range of its electronic components. Keeping the jitter of the optical signals within the operating range of the electronic components requires expensive frequency control equipment. Electronic components with frequency ranges wide enough to accommodate normal optical frequency jitter are also expensive, however.

SUMMARY OF THE INVENTION

An object of the present invention is to provide an optical phase locked loop that makes efficient use of the light generated by its local light source.

Another object is to provide an optical phase locked loop that does not require internal optical amplification.

Another object is to provide an optical phase locked loop that can operate with electronic components having comparatively narrow operating frequency ranges.

Another object is to provide an optical phase locked loop that can convert a received PSK optical signal to an OOK optical signal, thereby enabling the demodulation of higher-speed PSK optical signals than was possible before.

An optical phase locked loop according to the present invention includes an optical coupler, a photoelectric transducer, a loop filter, a voltage controlled oscillator, a local light source, and a single sideband modulator.

The optical coupler receives an input optical signal and a reproduced optical signal and generates an optical beat signal with an intensity responsive to the phase difference between the input optical signal and the reproduced optical signal. The photoelectric transducer converts the optical beat signal to a converted electrical signal.

The loop filter smoothes the converted electrical signal to generate a control signal having a voltage level representing a time-averaged value of the converted electrical signal. If the input optical signal has a pulsed waveform, the loop filter smoothes out the pulses so that they are not evident in the control signal. The voltage controlled oscillator generates a radio-frequency signal having a frequency that varies as a function of the voltage level of the control signal.

The local light source generates a reference optical signal preferably having a frequency offset from the nominal frequency of the input optical signal. The single sideband modulator uses the radio-frequency signal to modulate the reference optical signal, thereby obtaining a plurality of sideband signals, combines the sideband signals into a single sideband signal including the energy of all of the sideband signals, and outputs the single sideband signal as the reproduced optical signal.

The voltage controlled oscillator operates in a range of frequencies around the nominal frequency offset between the input and reference optical signals. Loop feedback locks the reproduced optical signal to the input optical signal in frequency and phase. In the locked state, the radio-frequency signal generated by the voltage controlled oscillator has a frequency exactly equal to the frequency offset between the input and reference optical signals.

Since the reproduced optical signal includes the energy of all sidebands of the modulated reference optical signal, a reproduced optical signal of adequate intensity is obtained without amplification. Since no optical amplifier is employed, receiving performance is not degraded by optical amplifier noise.

The reproduced optical signal can be used as a reference signal for coherent demodulation of the input optical signal; alternatively, the information content of the input optical signal can be detected from the optical beat signal or the converted electrical signal.

The single sideband modulator preferably includes an electrical splitter, a capacitor, an optical splitter, an optical phase shifter, and a pair of optical intensity modulators.

The optical splitter splits the reference optical signal into a pair of identical reference optical signals. The phase shifter shifts the phase of one of these reference optical signal by $\pi/2$.

The electrical splitter splits the radio-frequency electrical signal into a pair of identical radio-frequency signals. The capacitor shifts the phase of one of these radio-frequency signals by $\pi/2$.

One optical intensity modulator uses the $\pi/2$ phase-shifted radio-frequency signal to modulate the unshifted reference optical signal, thereby generating a first modulated optical signal.

The other optical intensity modulator uses the unshifted radio-frequency signal to modulate the $\pi/2$ phase-shifted optical signal, thereby generating a second modulated optical signal.

The optical combiner combines the first and second modulated optical signals to generate the reproduced optical signal.

The optical phase locked loop may have a double loop structure including a second photoelectric transducer, a second loop filter, and a second voltage controlled oscillator that operate as above on the output of the optical coupler, except that a frequency discrimination loop circuit is inserted between the second photoelectric transducer and the second loop filter. The frequency discrimination loop circuit outputs a frequency discrimination signal having a value representing a size of temporal changes in frequency of the input optical carrier signal. The second loop filter obtains the control signal for the second voltage controlled oscillator from the frequency discrimination signal. A radio-frequency adder adds the two radio-frequency signals produced by the two voltage controlled oscillators to obtain the radio-frequency signal supplied to the single sideband modulator.

In this configuration, the second voltage controlled oscillator mainly performs a frequency locking function, leaving the phase-locking function mainly to be performed by the first voltage controlled oscillator. Consequently, neither voltage controlled oscillator needs to operate over a wide frequency range, and comparatively inexpensive voltage controlled oscillators can be used to maintain the locked state, even if the input optical signal or the reference optical signal includes frequency jitter.

The frequency discrimination loop circuit may include a capacitor, a pair of delay elements, a pair of multipliers, a signal adder, and three electrical splitters.

One electrical splitter splits the output of the second photoelectric transducer to generate a pair of identical converted electrical signals. The capacitor shifts the phase of one of these converted electrical signals by $\pi/2$. Another electrical splitter splits the resulting $\pi/2$ phase shifted signal to generate a first electrical signal and a second electrical signal. One of the delay elements delays the first electrical signal to generate a third electrical signal. The third electrical splitter splits the other converted electrical signal to generate a fourth electrical signal and a fifth electrical signal. The other delay element delays the fourth electrical signal to generate a sixth electrical signal. The multipliers multiply the second electrical signal by the sixth electrical signal and the third electrical signal by the fifth electrical signal, and the signal adder adds the product signals to obtain the frequency discrimination signal.

In either the single-loop or double-loop configuration, the optical phase locked loop may have an input optical splitter that splits the input optical signal into a first input optical signal, which is supplied to the optical coupler, and a second input optical signal, which is supplied to another photoelectric transducer and converted to an input electrical signal. A clock signal extractor recovers a clock signal from the input electrical signal. A timing adjuster adjusts the timing of the clock signal. A reproduced pulse train generator inserted between the singe-sideband modulator and the optical coupler gates the reproduced optical signal by the adjusted clock signal so that the optical coupler receives the reproduced optical signal as a reproduced optical pulse train.

This configuration may be used when the input optical signal is a phase-modulated pulse train signal. The timing adjuster adds a delay to the clock signal that causes the pulses of the reproduced optical pulse train to coincide with the pulses of the input optical signal.

The optical coupler in this case may be a ninety-degree (90°) optical hybrid that outputs a first pair of optical beat signals and a second pair of optical beat signals. The photoelectric transducer includes first and second balanced photodetectors that convert the first and second pairs of optical beat signals to first and second demodulated electrical signals. A multiplier multiplies the first and second demodulated electrical signal together to generate the converted electrical signal.

One of the optical beat signals may also be output as an ASK or OOK signal from which the information content of the input optical signal can be obtained. If, for example, the input optical signal is a binary PSK signal, each optical beat signal becomes an OOK signal in which '0' and '1' data are represented by the presence and absence or vice versa or an optical pulse.

Alternatively, the first and second demodulated electrical signals may be used as complementary signals representing the '0' and '1' data in positive logic and negative logic.

DETAILED DESCRIPTION OF THE INVENTION

Figure 1:
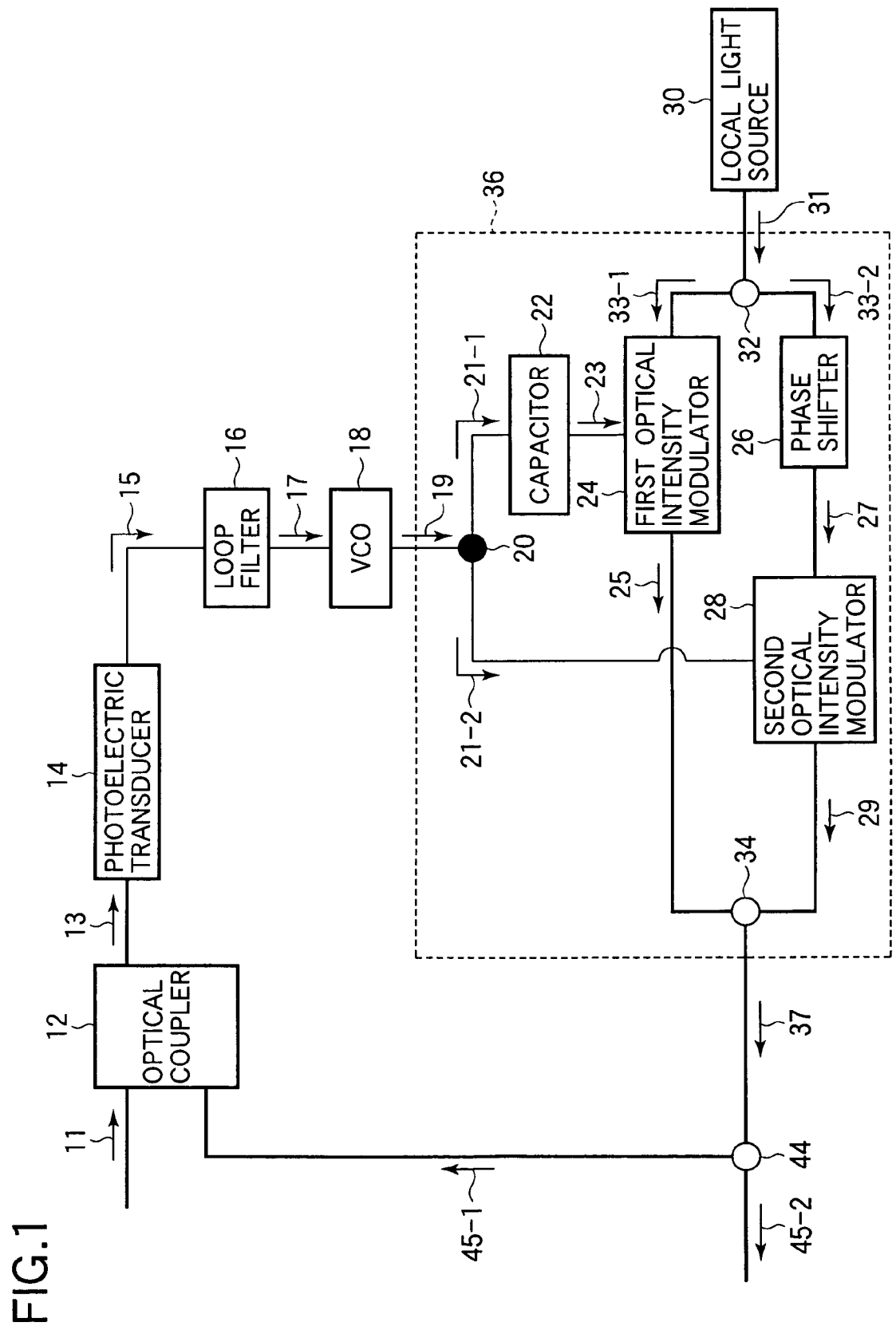
FIG. 1 is a schematic block diagram illustrating a first optical phase locked loop embodying the invention.

The above embodiments of the invention will now be described with reference to the attached exemplary drawings, in which like elements are indicated by like reference characters.

First Embodiment

FIG. 1 illustrates the first embodiment of the invention, showing the optical coupler 12, photoelectric transducer 14, voltage controlled oscillator (VCO) 18, local light source 30, and single sideband modulator 36, and the internal structure of the single sideband modulator 36. The first embodiment also includes an output coupler or output optical splitter 44.

The optical coupler 12 receives an input optical carrier signal 11 and a reproduced optical carrier signal 45-1. The reproduced optical carrier signal 45-1 is continuous and unmodulated. The input optical carrier signal 11 may be pulsed or continuous, and may be phase-modulated or unmodulated. The optical coupler 12 outputs an optical beat signal 13, the intensity of which varies according to the phase difference between the input optical carrier signal 11 and reproduced optical carrier signal 45-1.

Incidentally, use of the term 'beat signal' does not imply that the input optical carrier signal and reproduced optical carrier signal have different frequencies. In the nominal state, the input optical carrier signal and reproduced optical carrier signal have the same frequency, denoted f (hertz) below.

The photoelectric transducer 14 converts the optical beat signal 13 to an electrical beat signal 15 with a current or voltage value that varies according to the intensity of the optical beat signal, thus according to the phase difference between the input optical carrier signal 11 and reproduced optical carrier signal 45-1. The loop filter 16 receives the electrical beat signal 15 and generates a VCO control signal 17 with a voltage level representing a time-averaged value of the electrical beat signal 15.

The local light source 30 outputs a reference optical carrier signal 31 with a frequency (f−Δf) nominally offset from the frequency of the input optical carrier signal 11 by a predetermined quantity (Δf hertz).

The VCO 18 generates an RF signal 19, the frequency of which is a function of the voltage level of the VCO control signal 17. The VCO 18 is designed so that when the input optical carrier signal 11 and reproduced optical carrier signal 37 have the same frequency and the phase difference between them has a predetermined nominal value, the frequency of the RF signal 19 is equal to the nominal frequency offset (Δf hertz) between the input optical carrier signal 11 and reference optical carrier signal 31.

The single sideband modulator 36 receives the RF signal 19 and the reference optical carrier signal 31 and performs a single sideband modulation operation that converts the reference optical carrier signal 31 to a reproduced optical carrier signal 37 with a frequency equal to the sum of the frequencies of the reference optical carrier signal 31 and RF signal 19. This operation is performed by an electrical splitter 20, a capacitor 22, a first optical intensity modulator 24, a phase shifter 26, a second optical intensity modulator 28, an optical splitter 32, and an optical combiner 34.

The electrical splitter 20 splits the RF signal 19 into a pair of RF signals 21-1, 21-2. RF signal 21-1 is supplied to the capacitor 22, which shifts its phase by $\pi/2$ to generate a $\pi/2$ phase-shifted RF signal 23.

The optical splitter 32 splits the (f−Δf)-hertz reference optical carrier signal 31 output from the local light source 30 into a first reference optical carrier signal 33-1 and a second reference optical carrier signal 33-2. The first reference optical carrier signal 33-1 is supplied to the first optical intensity modulator 24, where it is modulated according to the $\pi/2$ phase-shifted RF signal 23 to generate a first modulated optical carrier signal 25.

The second reference optical carrier signal 33-2 is supplied to the phase shifter 26, which shifts its phase by $\pi/2$ to generate a $\pi/2$ phase-shifted reference optical carrier signal 27. The second optical intensity modulator 28 modulates the $\pi/2$ phase-shifted reference optical carrier signal 27 according to RF signal 21-2 to generate a second modulated optical carrier signal 29. The optical combiner 34 combines the first and second modulated optical carrier signals 25, 29 to generate the reproduced optical carrier signal 37.

Using the letter t as a time variable, the first and second reference carrier signals 31-1, 31-2 can both be represented by the expression $\sin\{(f \times \Delta f)t\}$. The split RF signals 21-1, 21-2 can both be represented as $\sin(\Delta ft)$.

The $\pi/2$ phase-shifted RF signal 23, which has been shifted in phase by the capacitor 22, can be represented as $\cos(\Delta ft)$. The modulation operation performed by the first optical intensity modulator 24 is equivalent to a multiplication operation, so the first modulated optical carrier signal 25 can be expressed as:

$$\cos(\Delta ft) \cdot \sin\{(f-\Delta f)t\}$$

This expression is equal to the following expression, which represents the first modulated optical carrier signal 25 as a sum of upper and lower sidebands of the reference optical carrier frequency f−Δf:

$$(\tfrac{1}{2})\sin\{ft\} + (\tfrac{1}{2})\sin\{(f-2\Delta f)t\}$$

Since the second reference optical carrier signal 33-2 is expressed as $\sin\{(f-\Delta f)t\}$ and the phase shifter 26 shifts the phase of the second reference optical carrier signal 33-2 by $\pi/2$, the $\pi/2$ phase-shifted reference optical carrier signal 27 can be expressed as $\cos\{(f-\Delta f)t\}$. The modulation operation performed by the second optical intensity modulator 28 is also equivalent to a multiplication operation, so the second modulated optical carrier signal 29 can be expressed as $$\sin(\Delta ft)\cdot\cos\{(f-\Delta f)t\},$$

or as follows as a sum of upper and lower sidebands $$(\tfrac{1}{2})\sin\{ft\}+(\tfrac{1}{2})\sin\{-(f-2\Delta f)t\}.$$

The combining operation performed by the optical combiner 34 can be represented as the addition of $\cos(\Delta ft)\cdot\sin\{(f-\Delta f)t\}$ to $\sin(\Delta ft)\cdot\cos\{(f-\Delta f)t\}$. The reproduced optical carrier signal 37 can accordingly be expressed as:

$$\cos(\Delta ft)\cdot\sin\{(f-\Delta f)t\}+\sin(\Delta ft)\cdot\cos\{(f-\Delta f)t\}=\sin(ft)$$

The amplitude of the reproduced optical carrier signal 37, which is expressed by $\sin(ft)$, is therefore equal to the amplitude of the reference optical carrier signals 33-1, 33-2, which are expressed as $\sin\{(f-\Delta f)t\}$, and is twice the amplitude of the sidebands of the modulated optical carrier signals 25, 27, which are expressed as $(\tfrac{1}{2})\sin(ft)$, $(\tfrac{1}{2})\sin\{(f-2\Delta f)t\}$, and $(\tfrac{1}{2})\sin\{-(f-2\Delta f)t\}$.

In generating the reproduced optical carrier signal 37 from the reference optical carrier signal 31, that is, in generating $\sin(ft)$ from $\sin\{(f-\Delta f)t\}$, the single sideband modulator 36 obtains the combined energy of both sidebands of both modulated optical carrier signals 25, 27, instead of just the energy of a single selected sideband of one modulated signal as in the prior art cited above. As the amplitude of the reproduced optical carrier signal 37 is twice the amplitude of any one of the sidebands of the two modulated optical carrier signals 25, 27, the energy of the reproduced optical carrier signal 37 is four times the energy of any one of the sidebands and therefore includes the energy of all four sidebands.

The output optical splitter 44 splits the reproduced optical carrier signal 37 to obtain the reproduced optical carrier signal 45-1 supplied to the optical coupler 12 and an identical reproduced optical carrier signal 45-2, which may be output for use as a reference signal in coherent demodulation.

Alternatively, if the optical input carrier signal is modulated, its information content may be detected from the optical beat signal 13 or the electrical beat signal 15; that is, the optical coupler 12 itself may also function as a detector or demodulator.

If the input optical carrier signal 11 and reproduced optical carrier signal 37 deviate from their nominal phase relationship, the level of the VCO control signal 17 rises or falls accordingly, causing the VCO 18 to vary the frequency of the RF signal 19. This feedback produces a corresponding variation in the frequency of the reproduced optical carrier signal 37 that acts to restore the nominal phase relationship between the input optical carrier signal 11 and reproduced optical carrier signal 45-1. The same feedback effect also compensates for frequency variations in the input optical carrier signal 11 and/or reference optical carrier signal 31, so that the reproduced optical carrier signal 37 and the recovered optical carrier signals 45-1, 45-2 remain locked in frequency and phase to the input optical carrier signal 11.

Second Embodiment

Figure 2:
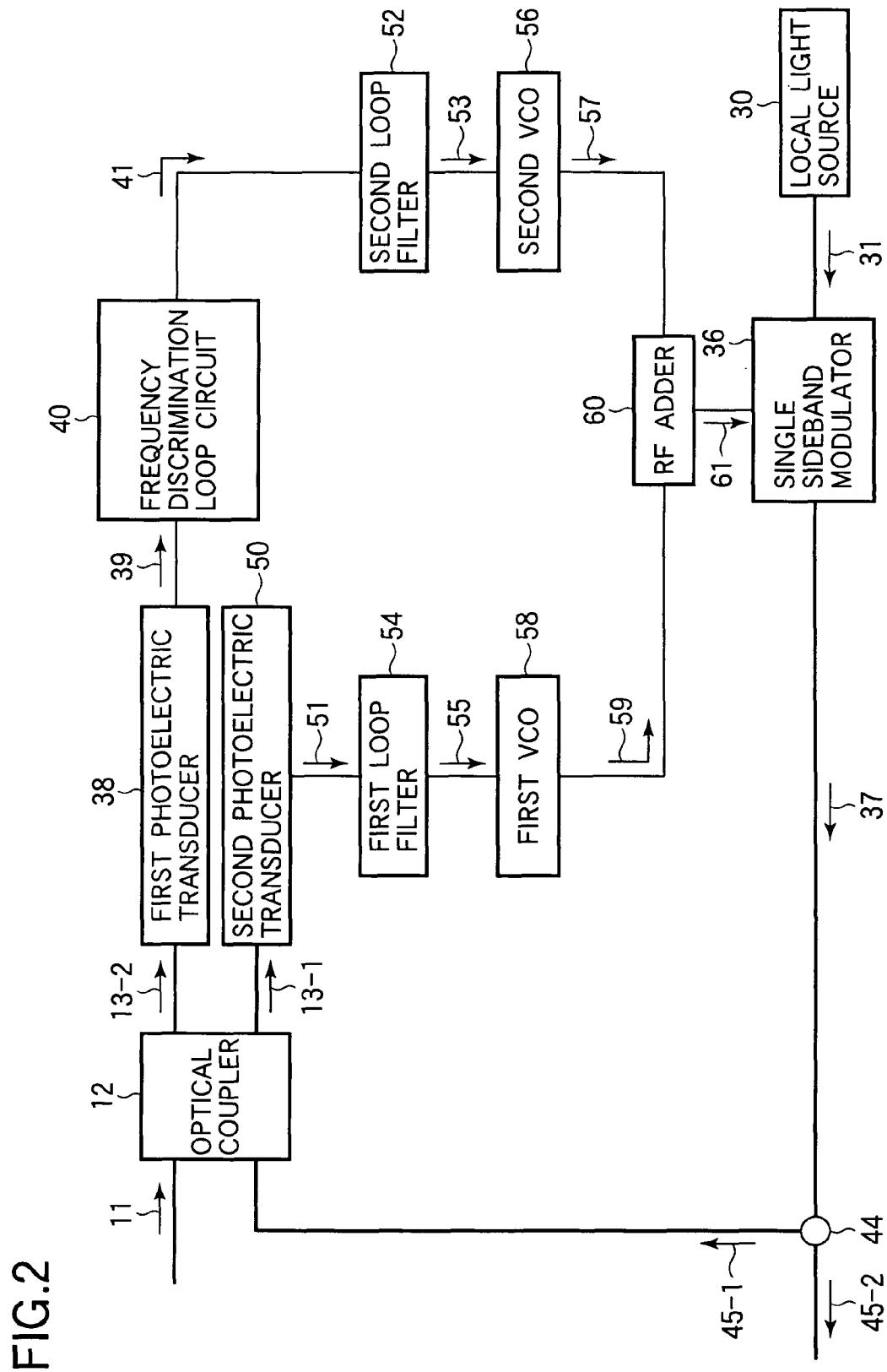
FIG. 2 is a schematic block diagram illustrating a second optical phase locked loop embodying the invention.

Referring to FIG. 2, the second embodiment modifies the optical coupler 12 to output a pair of optical beat signals, and employs a pair of photoelectric transducers 38, 50, a frequency discrimination loop circuit 40, a pair of loop filters 52, 54, a pair of VCOs 56, 58, and an RF adder 60 in addition to the local light source 30, single sideband modulator 36, and output optical splitter 44 that were also used in the first embodiment. The single sideband modulator 36 has the same internal structure as in the first embodiment.

As in the first embodiment, the optical coupler 12 receives an input optical carrier signal 11 and a reproduced optical carrier signal 45-1 of nominally identical frequency f. The optical beat signals 13-1, 13-2 output by the optical coupler 12 are mutually identical signals both similar to the optical beat signal 13 in the first embodiment, their intensity varying according to the phase difference between the input optical carrier signal 11 and reproduced optical carrier signal 45-1. Both photoelectric transducers operate as in the first embodiment, the first photoelectric transducer 50 converting the first optical beat signal 13-1 to a first electrical beat signal 51, the second photoelectric transducer 38 converting the second optical beat signal 13-2 to a second electrical beat signal 39.

The first electrical beat signal 51 is supplied to the first loop filter 54, which generates a first VCO control signal 55 representing a time-average of the first electrical beat signal 51. The first VCO 58 receives the first VCO control signal 55 and generates a first RF signal 59 with a frequency that is a function of the voltage level of the first VCO control signal 55. The frequency of the first RF signal 59 depends on the phase difference between the input optical carrier signal 11 and reproduced optical carrier signal 45-1.

The frequency discrimination loop circuit 40 receives the second electrical beat signal 39 and generates a frequency discrimination signal 41 with a value representing changes in the difference between the frequency of the input optical carrier signal 11 and the frequency of the reproduced optical carrier signal 45-1. The second loop filter 52 receives the frequency discrimination signal 41 and generates a second VCO control signal 53 representing a time-average of the frequency discrimination signal 41. The second VCO 56 receives the second VCO control signal 53 and generates a second RF signal 57 with a frequency that is a function of the voltage level of the second VCO control signal 53. The frequency of the second RF signal 57 varies as the frequency of the input optical carrier signal 11 deviates from the frequency of the reproduced optical carrier signal 45-1.

The RF adder 60 additively combines the first and second RF signals 59, 57 to generate a third RF signal or combined RF signal 61 with a frequency that depends on both phase and frequency differences between the input optical carrier signal 11 and reproduced optical carrier signal 45-1. The combined RF signal 61 is supplied to the single sideband modulator 36.

The single sideband modulator 36 uses the combined RF signal 61 to modulate the reference optical carrier signal 31 output by the local light source 30 as described in the first embodiment, generating a reproduced optical carrier signal 37 with a nominal frequency equal to f. The output optical splitter 44 splits the reproduced optical carrier signal 37 into the reproduced optical carrier signal 45-1 supplied to the optical coupler 12 and a reproduced optical carrier signal 45-2 that may be output for use in demodulation. If the input optical carrier signal 11 and reproduced optical carrier signal 45-1 differ in frequency or deviate from the predetermined phase relationship, feedback operates to keep the reproduced optical carrier signal 37 and the recovered optical carrier signals 45-1, 45-2 in lock with the input optical carrier signal 11.

Figure 3:
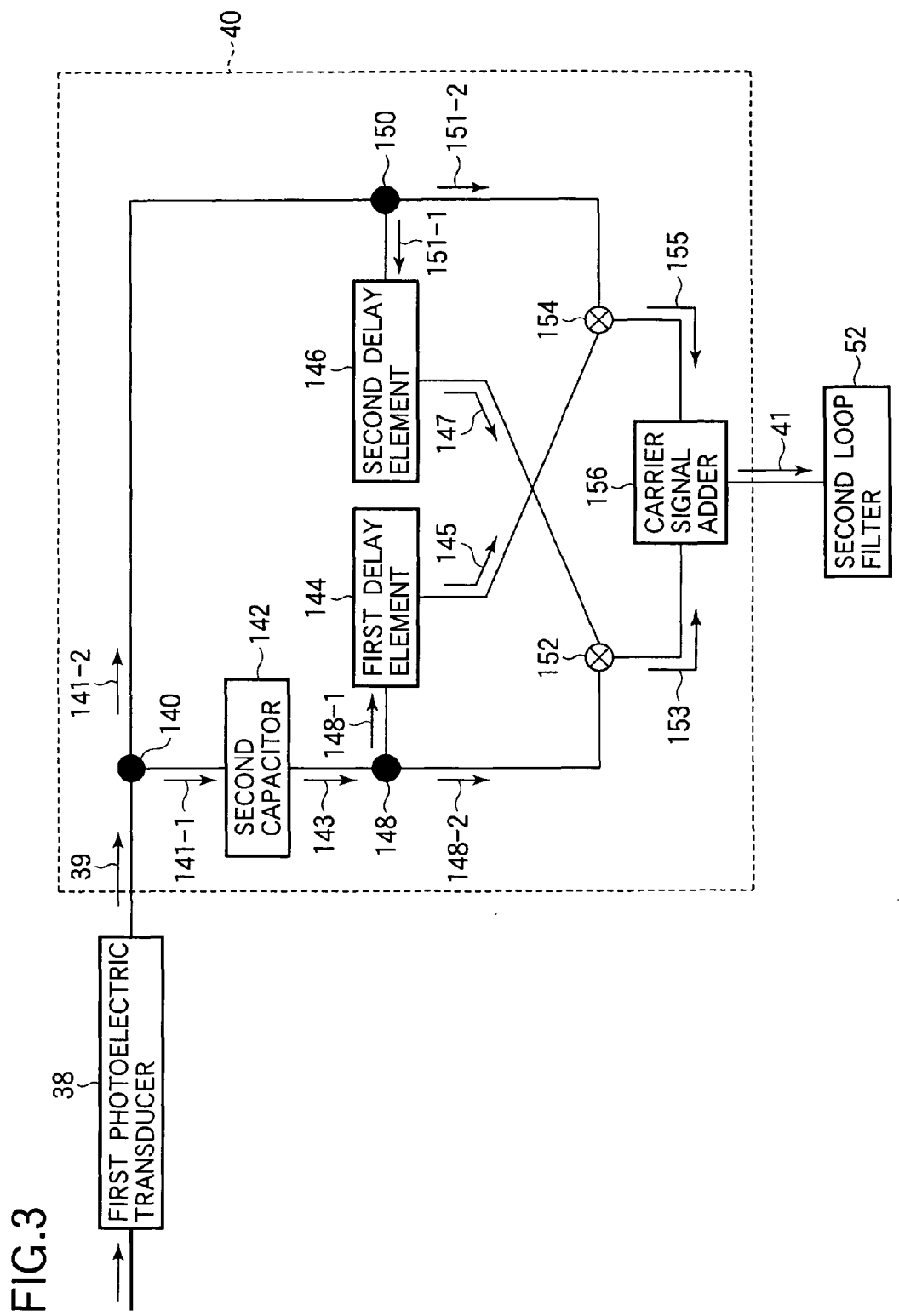
FIG. 3 is a schematic block diagram illustrating the frequency discrimination loop circuit in FIG. 2.

Referring to FIG. 3, the frequency discrimination loop circuit 40 comprises three electrical splitters 140, 148, 150, a second capacitor 142, a pair of delay elements 142, 144, a pair of multipliers 152, 154, and a carrier signal adder 156.

The first electrical splitter 140 splits the second electrical beat signal 39 into a third electrical beat signal 141-1 and a fourth electrical beat signal 141-2. The second capacitor 142 shifts the phase of the third electrical beat signal 141-1 by π/2 to generate a π/2 phase-shifted electrical beat signal 143, which is supplied to the second electrical splitter 148. The second electrical splitter 148 splits the π/2 phase-shifted electrical beat signal 143 into a first electrical signal 148-1, which is supplied to the first delay element 144, and a second electrical signal 148-2, which is supplied to the first multiplier 152. Similarly, the third electrical splitter 150 splits the fourth electrical beat signal 141-2 into a fourth electrical signal 151-1, which is supplied to the second delay element 146, and a fifth electrical signal 151-2, which is supplied to the second multiplier 154.

The first delay element 144 delays the first electrical signal 148-1 by a predetermined time Δt to generate a third electrical signal 145. The second delay element 146 delays the fourth electrical signal 151-1 by the same predetermined time Δt to generate a sixth electrical signal 147.

The first multiplier 152 multiplies the second electrical signal 148-2 by the sixth electrical signal 147 to generate a seventh electrical signal 153. The second multiplier 154 multiplies the fifth electrical signal 151-2 by the third electrical signal 145 to generate an eighth electrical signal 155. The carrier signal adder 156 additively combines the seventh electrical signal 153 and eighth electrical signal 155 to generate the frequency discrimination signal 41.

The delay parameter Δt determines the response speed of the frequency discrimination loop circuit 40. Decreasing the delay parameter Δt increases the sensitivity of the frequency discrimination loop circuit 40, enabling it to capture shorter-term fluctuations in the frequency of the second electrical beat signal 39.

The optical phase locked loop in the second embodiment can be viewed as comprising a frequency-locked loop including the frequency discrimination loop circuit 40, second loop filter 52, and second VCO 56, and a separate phase-locked loop including the first loop filter 54 and first VCO 58. The frequency discrimination loop circuit 40 responds to the beat frequency of the second electrical beat signal 39, which reflects the frequency deviation of the input optical carrier signal 11 from the frequency of the reproduced optical carrier signal 45-1. The second VCO control signal 57 indicates the frequency deviation between the input optical carrier signal 11 and the reproduced optical carrier signal 45-1 without indicating the phase deviation between these signals. The second VCO 56 is therefore chiefly responsible for maintaining frequency lock, while the first VCO 58 is chiefly responsible for maintaining phase lock. Because of this division of functions, neither of the two VCOs 56, 58 has to operate over as wide a frequency range as the VCO in the first embodiment.

Conversely, if both VCOs 56 and 58 have the same operating frequency range as the VCO in the first embodiment, the optical phase locked loop in the second embodiment can tolerate more frequency jitter in the received optical carrier signal and reference optical carrier signal than could be tolerated in the first embodiment.

Third Embodiment

Figure 4:
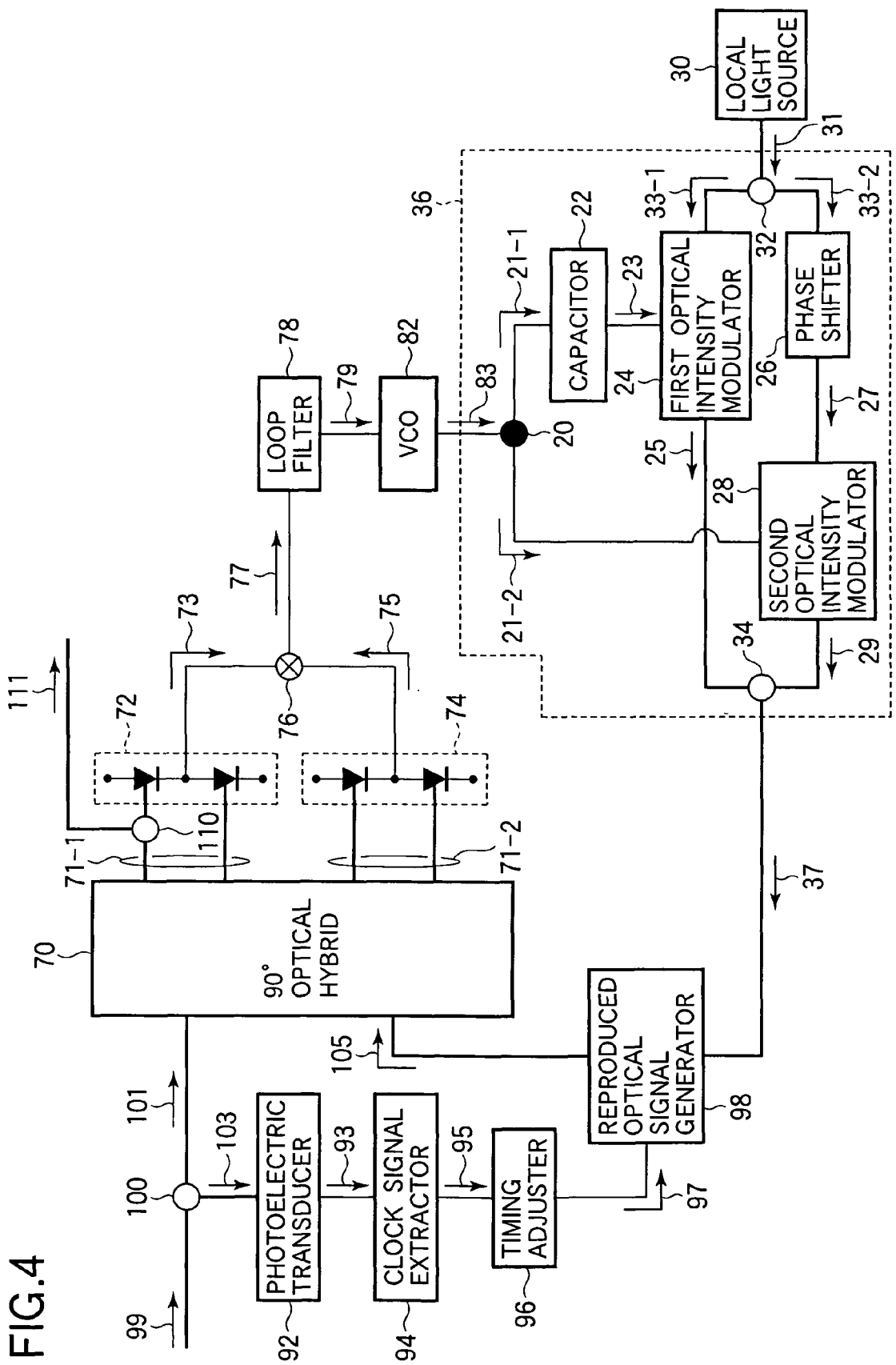
FIG. 4 is a schematic block diagram illustrating a third optical phase locked loop embodying the invention.

Referring to FIG. 4, the optical phase locked loop in the fourth embodiment comprises a local light source 30 and a single sideband modulator 36 as described in the first embodiment, and a 90° optical hybrid 70, a pair of balanced photodetectors 72, 74, a multiplier 76, a loop filter 78, a VCO 82, a photoelectric transducer 92, a clock signal extractor 94, a timing adjuster 96, a reproduced optical signal generator 98, an input optical splitter 100, and an output optical splitter 110.

The third embodiment is configured to perform phase-diversity detection of a pulsed PSK-modulated optical signal.

The input optical splitter 100 receives the pulsed PSK-modulated optical carrier signal as an input optical signal 99 and splits the input optical signal 99 into a first input optical signal 101 and a second input optical signal 103. The 90° optical hybrid 70 receives the first input optical signal 101 and a reproduced PSK optical signal 105 and generates two pairs of optical beat signals 71-1, 71-2 with intensities that depend on the phase difference between the first input optical signal 101 and reproduced PSK optical signal 105, but with different phases as described below. The first balanced photodetector 72 converts the first pair of optical beat signals 71-1 to a first demodulated signal 73. The second balanced photodetector 74 converts the second pair of optical beat signals 71-2 to a second demodulated signal 75. The output optical splitter 110 also splits one of the first pair of optical beat signals 71-1 to obtain an optical output signal 111.

The term 'reproduced PSK optical signal' does not imply that the reproduced PSK optical signal 105 is phase-modulated. The only modulation of the reproduced PSK optical signal 105 is an intensity modulation or gating process that converts the reproduced optical carrier signal 37 to a pulse train, as described below.

The multiplier 76 multiplies the first demodulated signal 73 by the second demodulated signal 75 to generate an optical phase difference detection signal 77 that has the same function as the electrical beat signal 15 in the first embodiment. The loop filter 78 filters the optical phase difference detection signal 77 to generate a VCO control signal 79 with a voltage level representing a time-average of the optical phase difference detection signal 77. The VCO 82 generates an RF signal 83 with a frequency that is a function of the voltage level of the VCO control signal 79.

The local light source 30 and single sideband modulator 36 operate as in the first embodiment. The single sideband modulator 36 uses the RF signal 83 output by the VCO 82 to modulate the reference optical carrier signal 31 output by the local light source 30, thereby generating a reproduced optical carrier signal 37.

The photoelectric transducer 92 receives the second input optical signal 103 from the input optical splitter 100 and converts it to an input electrical signal 93. The clock signal extractor 94 recovers a clock signal 95 from the input electrical signal 93. Clock recovery is a known art and a conventional clock recovery circuit may be used, so a detailed description will be omitted.

The timing adjuster 96 delays the recovered clock signal 95 by a predetermined amount to adjust its timing, and outputs the adjusted clock signal 97. The reproduced optical signal generator 98 receives the adjusted clock signal 97 from the timing adjuster 96 and the reproduced optical carrier signal 37 from the single sideband modulator 36 and generates the reproduced PSK optical signal 105, essentially by gating the reproduced optical carrier signal 37 with the clock signal 97 to produce a pulsed optical signal.

The reproduced optical carrier signal 37 is an unmodulated continuous wave with a constant amplitude and power and a constant frequency f. The timing adjuster 96 adjusts the timing of the clock signal 97 so that the optical pulses constituting the reproduced PSK optical signal 105 coincide temporally with the optical pulses in the second input optical signal 103.

A known optical intensity modulator may be used as the reproduced optical signal generator 98.

The reproduced optical signal generator 98 may be configured from an actively mode-locked semiconductor laser. For example, the continuous-wave reproduced optical carrier signal 37 may be injected into an actively mode-locked semiconductor laser driven by the adjusted clock signal 97. The reproduced PSK optical signal 105 output from the actively mode-locked semiconductor laser will be an optical pulse train in which the pulses have the phase of the reproduced optical carrier signal 37 and coincide on the time axis with the pulses constituting the second input optical signal 103. The pulses in the reproduced PSK optical signal 105 therefore also coincide with the pulses constituting the first input optical signal 101.

The feedback loop in the third embodiment includes the 90° optical hybrid 70, loop filter 78, VCO 82, single sideband modulator 36, and reproduced optical signal generator 98. Feedback operates to hold the frequency of the RF signal 83 output from the VCO 82 at the predetermined offset $\Delta f$. As a result of this feedback, not only are the pulses of the input optical signal 99 and the reproduced PSK optical signal 105 synchronized; the reproduced PSK optical signal 105 is also locked in frequency and phase with the input optical signal 99.

The 90° optical hybrid 70 and the first and second balanced photodetectors 72, 74 form a type of Costas loop, which operates as follows, assuming that the input optical signal 99 is a binary PSK signal.

Figure 5:
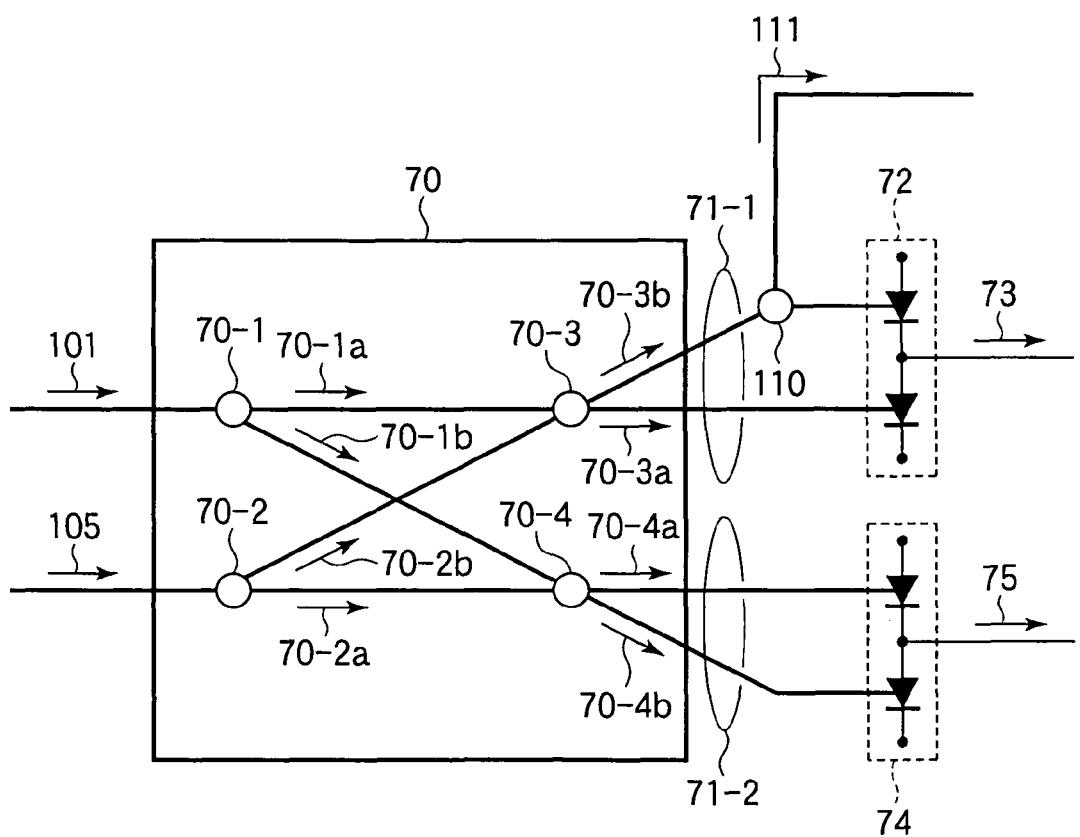
FIG. 5 is a schematic block diagram illustrating the 90° optical hybrid and balanced photodetectors in FIG. 4.

Referring to FIG. 5, the 90° optical hybrid 70 is a known type of optical coupler having four constituent optical couplers 70-1, 70-2, 70-3, 70-4 interconnected so as to generate four optical signals in which the input optical signal and the reproduced PSK optical signal are combined with four different mutual phase offsets stepped at 90° ($\pi/2$) intervals. Optical coupler 70-1 splits the first input optical signal 101 into orthogonal phase components, that is, into two optical signals 70-1a, 70-b that differ mutually by 90° in phase. Optical coupler 70-2 similarly splits the reproduced PSK optical signal 105 into two components to obtain optical signals 70-2a, 70-2b. Optical coupler 70-3 combines optical signals 70-1a and 70-2b and splits the combined signal into two components, obtaining optical signals 70-3a and 70-3b. Optical coupler 70-4 operates similarly on optical signals 70-1b and 70-2a to obtain optical signals 70-4a and 70-4b.

All four output signals 70-3a, 70-3b, 70-4a, 70-4b are optical pulse trains in which the PSK-modulated input optical signal has been converted to an intensity-modulated or OOK-modulated signal. One of them can be tapped to obtain an intensity-modulated output signal 111. In the drawing, the output optical splitter 110 splits the intensity-modulated output signal 111 off from optical signal 70-3b in the first pair of optical beat signals 71-1.

Optical signals 70-3a and 70-3b, constituting the first pair of optical beat signals 71-1, are input to the first balanced photodetector 72, which comprises two photodiodes coupled in series. A first demodulated signal 73 is obtained from a node between the two photodiodes. Similarly, optical signals 70-4a and 70-4b, constituting the second pair of optical beat signals 71-2, are input to the second balanced photodetector 74, which also comprises two photodiodes and produces a second demodulated signal 75. Because of the phase relationships of optical signals 70-3a, 70-3b, 70-4a, 70-4b, the first and second demodulated signals 73, 75 are mutually complementary and express the information content of the input optical signal in positive logic and negative logic, respectively.

Figure 6:
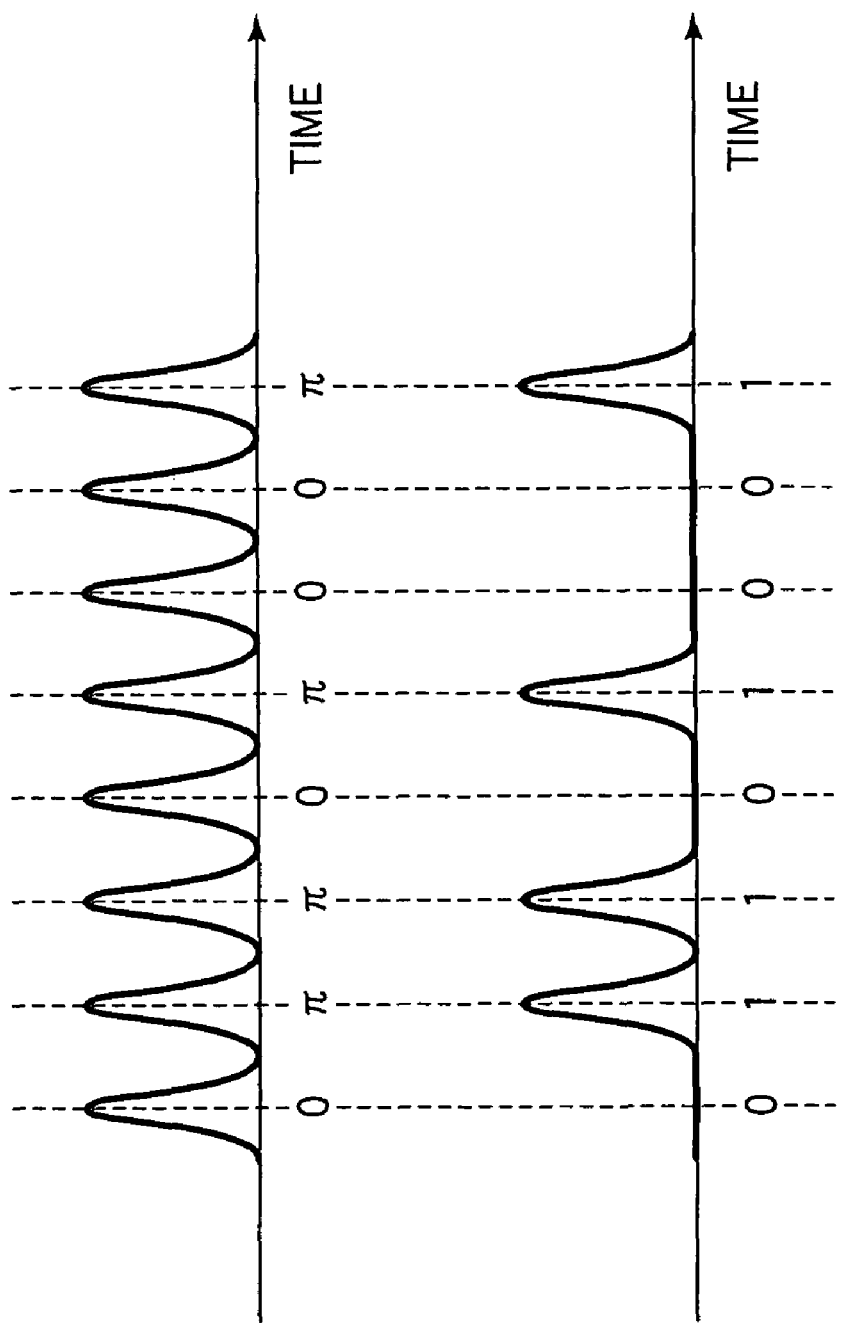
FIGS. 6A and 6B are graphs illustrating the conversion of an input PSK optical signal to an OOK optical signal.

The operation of the 90° optical hybrid 70 is further illustrated in FIGS. 6A and 6B. The pulse-train waveform of the first input optical signal 101 is shown in FIG. 6A, where the notations $\pi$ and 0 indicate the phases of the individual pulses. The pulse-train waveform of the intensity-modulated output signal 111 is shown in FIG. 6B, where 1 and 0 indicate the presence and absence of pulses. It can be seen that interference between the first input optical signal 101 and the reproduced PSK optical signal 105 in the 90° optical hybrid 70 converts the PSK signal to an OOK signal. Pulses with phase 0 in the first input optical signal 101 interfere destructively with the corresponding pulses in the reproduced PSK optical signal 105, while pulses with phase $\pi$ in the first input optical signal 101 interfere constructively with the corresponding pulses in the reproduced PSK optical signal 105.

Fourth Embodiment

The fourth embodiment combines the features of the second and third embodiments.

Figure 7:
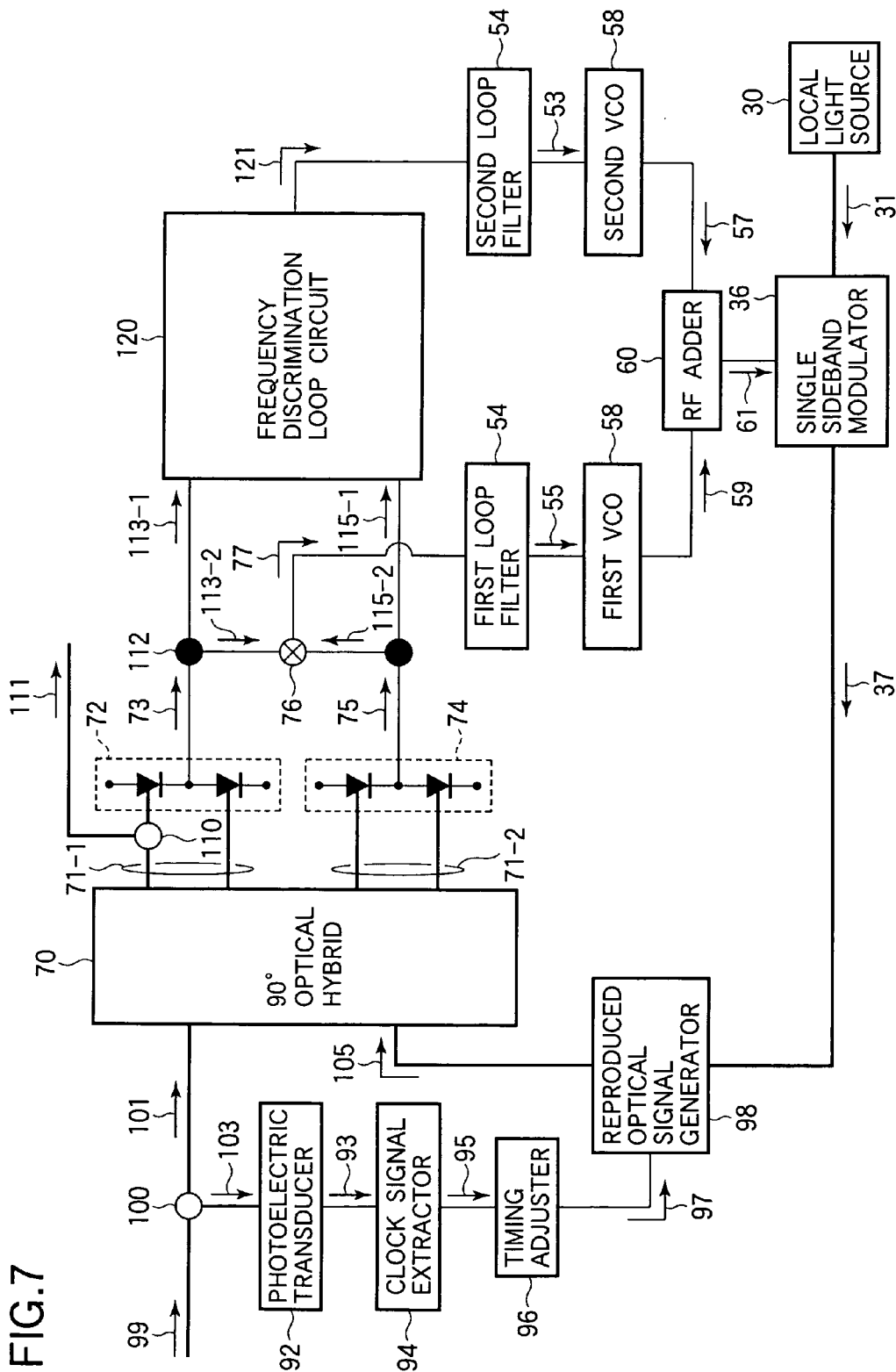
FIG. 7 is a schematic block diagram of a fourth optical phase locked loop embodying the invention.

Referring to FIG. 7, the fourth embodiment replaces the single loop filter and VCO of the third embodiment with a pair of loop filters 52, 54, a pair of VCOs 56, 58, and an RF adder 60, as in the second embodiment, and adds a pair of electrical splitters 112, 114 and a frequency discrimination loop circuit 120. The local light source 30, single sideband modulator 36, 90° optical hybrid 70, balanced photodetectors 72, 74, multiplier 76, photoelectric transducer 92, clock signal extractor 94, timing adjuster 96, reproduced optical signal generator 98, and input optical splitter 100 are as described in the third embodiment.

The first electrical splitter 112 splits the first demodulated signal 73 output from the first balanced photodetector 72 into two identical first demodulated signals 113-1, 113-2, which are supplied to the frequency discrimination loop circuit 120 and the multiplier 76, respectively. Similarly, the second electrical splitter 114 splits the second demodulated signal 75 output from the second balanced photodetector 74 into two identical second demodulated signals 115-1, 115-2, which are supplied to the frequency discrimination loop circuit 120 and the multiplier 76, respectively.

The multiplier 76 generates an optical phase difference detection signal 77 from the first and second demodulated signals 113-2, 115-2 as in the third embodiment. The frequency discrimination loop circuit 120 generates a frequency discrimination signal 121 with a value representing changes in the frequency of the first input optical signal 101.

The first loop filter 54 receives the optical phase difference detection signal 77 from the multiplier 76. The second loop filter 52 receives the frequency discrimination signal 121 from the frequency discrimination loop circuit 120. The loop filters 52, 54, VCOs 56, 58, RF adder 60, and single sideband modulator 36 then operate as in the second embodiment to convert the reference optical carrier signal 31 output from the local light source 30 to a reproduced optical carrier signal 37 locked in frequency and phase to the first input optical signal 101, the second loop filter 52 mainly performing the frequency locking function, the first loop filter 54 mainly performing the phase locking function.

The frequency discrimination loop circuit 120 in the fourth embodiment has substantially the same internal structure as the frequency discrimination loop circuit 40 in the second embodiment without the first electrical splitter 140 and second capacitor 142 in FIG. 3, which are unnecessary because the frequency discrimination loop circuit 120 receives a pair of demodulated signals 113-1, 115-1 that are already mutually shifted in phase.

Figure 8:
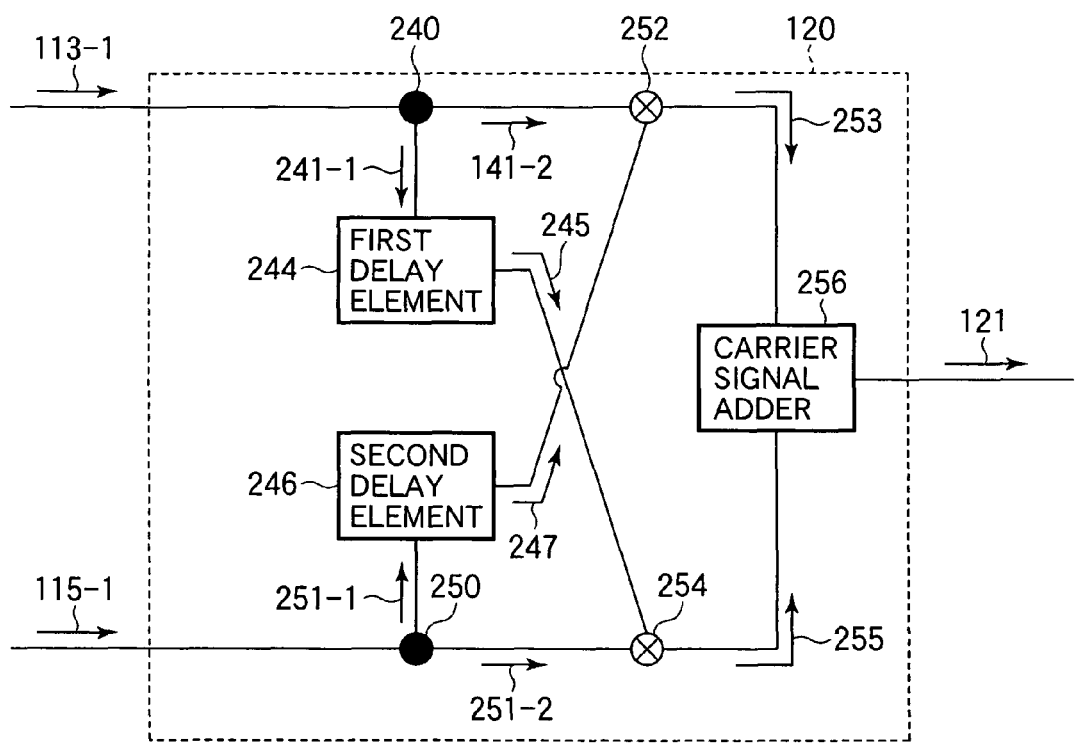
FIG. 8 is a schematic block diagram of the frequency discrimination loop circuit in FIG. 7.

Referring to FIG. 8, the frequency discrimination loop circuit 120 comprises a pair of electrical splitters 240, 250, a pair of delay elements 244, 246, a pair of multipliers 252, 254, and a carrier signal adder 256.

Electrical splitter 240 splits the first demodulated signal 113-1 into a first electrical signal 241-1 and a first electrical signal 241-2. The first delay element 244 delays the first electrical signal 241-1 by a predetermined time Δt to generate a third electrical signal 245. Electrical splitter 250 splits the second demodulated signal 115-1 into a fourth electrical signal 251-1 and a fifth electrical signal 251-2. The second delay element 246 delays the fourth electrical signal 251-1 by the same predetermined time Δt to generate a sixth electrical signal 247. The first multiplier 252 multiplies the first electrical signal 241-2 by the sixth electrical signal 247 to generate a seventh electrical signal 253. The second multiplier 254 multiplies the fifth electrical signal 251-2 by the third electrical signal 245 to generate an eighth electrical signal 255. The carrier signal adder 256 additively combines the seventh and eighth electrical signals 253, 255 to generate the frequency discrimination signal 121.

Because of the use of separate VCOs for frequency and phase locking, the fourth embodiment can lock the reproduced PSK optical signal 105 accurately in both frequency and phase with the first input optical signal 101, and the required output frequency range of each VCO is reduced as compared with the third embodiment.

The invention is not limited to the foregoing embodiments. Those skilled in the art will recognize that further variations are possible within the scope of the invention, which is defined in the appended claims.

What is claimed is:

1. An optical phase locked loop comprising:
   an optical coupler for receiving an input optical signal and a reproduced optical signal and generating a first optical beat signal from the input optical signal and the reproduced optical signal;
   a first photoelectric transducer for converting the first optical beat signal to a first converted electrical signal;
   a first loop filter for converting the first converted electrical signal output by the first photoelectric transducer to a first control signal having a voltage level representing a time-averaged value of the first converted electrical signal;
   a first voltage controlled oscillator for receiving the first control signal and generating a first radio-frequency signal having a frequency that varies as a function of the voltage level of the first control signal;
   a local light source for generating a reference optical signal; and
   a single sideband modulator for using the first radio-frequency signal to perform intensity modulation of the reference optical signal to obtain a plurality of sideband signals, combining the plurality of sideband signals into a single sideband signal including all energy of the plurality of sideband signals, and outputting the single sideband signal as the reproduced optical signal.

2. The optical phase locked loop of claim 1, wherein the input optical signal has a first frequency and the reference optical signal has a second frequency offset from the first frequency.

3. The optical phase locked loop of claim 1, wherein the reference optical signal is an unmodulated continuous-wave optical signal.

4. The optical phase locked loop of claim 1, wherein the single sideband modulator further comprises:
   a first electrical splitter for splitting the first radio-frequency electrical signal to generate a second radio-frequency signal and a third radio-frequency signal;
   a first capacitor for receiving the second radio-frequency signal and shifting the second radio-frequency signal in phase by $\pi/2$ to generate a $\pi/2$ phase-shifted radio-frequency signal;
   a first optical splitter for splitting the reference optical signal into a first reference optical signal and a second reference optical signal;
   a first optical intensity modulator for using the $\pi/2$ phase-shifted radio-frequency signal to modulate the first reference optical signal, thereby generating a first modulated optical signal;
   a phase shifter for receiving the second reference optical signal and shifting the second reference optical signal in phase by $\pi/2$ to generate a $\pi/2$ phase-shifted optical signal;
   a second optical intensity modulator for using the third radio-frequency signal to modulate the $\pi/2$ phase-shifted optical signal, thereby generating a second modulated optical signal; and
   a first optical combiner for combining the first modulated optical signal and the second modulated optical signal to generate the reproduced optical signal.

5. The optical phase locked loop of claim 1, wherein the input optical signal is a continuous wave signal.

6. The optical phase locked loop of claim 1, further comprising an output optical splitter for splitting the reproduced optical signal to obtain an output optical signal.

7. The optical phase locked loop of claim 1, wherein the first converted electrical signal indicates an intensity of the optical beat signal.

8. The optical phase locked loop of claim 1, wherein the optical coupler also generates a second optical beat signal identical to the first optical beat signal, the optical phase locked loop further comprising:
   a second photoelectric transducer for receiving the second optical beat signal and converting the second optical beat signal to a second converted electrical signal;
   a frequency discrimination loop circuit for receiving the second converted electrical signal and generating a frequency discrimination signal having a value representing a size of temporal changes in frequency of the input optical carrier signal;
   a second loop filter for receiving the frequency discrimination signal and generating a second control signal having a voltage level representing a time-averaged value of the frequency discrimination signal;
   a second voltage controlled oscillator for receiving the second control signal and generating a fourth radio-frequency signal having a frequency given as a function of the voltage level of the second control signal; and
   a radio-frequency adder for adding the fourth radio-frequency signal to the first radio-frequency signal before the first radio-frequency signal is supplied to the single sideband modulator, so that the single sideband modulator uses a sum of the first and second radio-frequency signals.

9. The optical phase locked loop of claim 8, wherein the frequency discrimination loop circuit further comprises:
   a second electrical splitter for splitting the second converted electrical signal to generate a third converted electrical signal and a fourth converted electrical signal;
   a capacitor for receiving the third converted electrical signal and shifting the third converted electrical signal in phase by $\pi/2$ to generate a $\pi/2$ phase shifted converted electrical signal;

a third electrical splitter for splitting the π/2 phase shifted converted electrical signal to generate a first electrical signal and a second electrical signal;

a first delay element for delaying the first electrical signal by a predetermined amount to generate a third electrical signal;

a fourth electrical splitter for splitting the fourth converted electrical signal to generate a fourth electrical signal and a fifth electrical signal;

a second delay element for delaying the fourth electrical signal by the predetermined amount to generate a sixth electrical signal;

a first multiplier for multiplying the second electrical signal by the sixth electrical signal to generate a seventh electrical signal;

a second multiplier for multiplying the third electrical signal by the fifth electrical signal to generate an eighth electrical signal; and a signal adder for adding the seventh electrical signal and the eighth electrical signal to generate the frequency discrimination signal.

10. The optical phase locked loop of claim 1, further comprising:

an input optical splitter for splitting the input optical signal into a first input optical signal and a second input optical signal and supplying the first input optical signal to the optical coupler;

a third photoelectric transducer for receiving the second input optical signal and converting the second input optical signal to an input electrical signal;

a clock signal extractor for receiving the input electrical signal and recovering a first clock signal from the input electrical signal;

a timing adjuster for receiving the first clock signal and adjusting a timing delay of the first clock signal to generate a second clock signal; and a reproduced pulse train generator inserted between the singe-sideband modulator and the optical coupler to gate the reproduced optical signal by the second clock signal so that the optical coupler receives the reproduced optical signal as a reproduced optical pulse train; wherein the optical coupler generates a first pair of optical beat signals and a second pair of optical beat signals from the first input optical signal and the reproduced optical pulse train, said first optical beat signal being one of the first pair of optical beat signals; and the first photoelectric transducer includes a first balanced photodetector for converting the first pair of optical beat signals to a first demodulated electrical signal, a second balanced photodetector for converting the second pair of optical beat signals to a second demodulated electrical signal, and a third multiplier for multiplying the first demodulated electrical signal by the second demodulated electrical signal to generate the first converted electrical signal.

11. The optical phase locked loop of claim 10, wherein the input optical signal is a phase-modulated optical pulse train.

12. The optical phase locked loop of claim 10, further comprising an output optical splitter for splitting the optical beat signal to obtain an optical output signal.

13. The optical phase locked loop of claim 10, wherein the optical coupler is a ninety-degree optical hybrid.

14. The optical phase locked loop of claim 13, wherein the optical coupler comprises:

a first coupler for splitting the first input optical signal into a first optical signal and a second optical;

a second coupler for splitting the reproduced optical pulse train into a third optical signal and a fourth optical signal;

a third coupler for combining the first optical signal and the fourth optical signal and outputting the first pair of optical beat signals; and a fourth coupler for combining the second optical signal and the third optical signal and outputting the second pair of optical beat signals.

15. The optical phase locked loop of claim 10, wherein the first converted electrical signal indicates an optical phase difference between the input optical signal and the reproduced optical pulse train.

16. The optical phase locked loop of claim 10, further comprising:

a frequency discrimination loop circuit for receiving the first demodulated electrical signal and the second demodulated electrical signal and generating a frequency discrimination signal having a value representing a size of temporal changes in frequency of the input optical signal;

a second loop filter for receiving the frequency discrimination signal and generating a second control signal having a voltage level representing a time-averaged value of the frequency discrimination signal;

a second voltage controlled oscillator for receiving the second control signal and generating a fourth radio-frequency signal having a frequency given as a function of the voltage level of the second control signal; and a radio-frequency adder for adding the fourth radio-frequency signal to the first radio-frequency signal before the first radio-frequency signal is supplied to the single sideband modulator, so that the single sideband modulator uses a sum of the first and fourth radio-frequency signals.

17. The optical phase locked loop of claim 16, wherein the frequency discrimination loop circuit further comprises:

a fifth electrical splitter for splitting the first demodulated signal to generate a first electrical signal and a second electrical signal;

a first delay element for delaying the first electrical signal by a predetermined amount to generate a third electrical signal;

a sixth electrical splitter for splitting the second demodulated signal to generate a fourth electrical signal and a fifth electrical signal;

a second delay element for delaying the fourth electrical signal by the predetermined amount to generate a sixth electrical signal;

a first multiplier for multiplying the second electrical signal by the sixth electrical signal to generate a seventh electrical signal;

a second multiplier for multiplying the third electrical signal by the fifth electrical signal to generate an eighth electrical signal; and a signal adder for adding the seventh electrical signal and the eighth electrical signal to generate the frequency discrimination signal.

* * * * *